(12) United States Patent  (10) Patent No.: US 8,251,004 B2
Olsen et al.  (45) Date of Patent: Aug. 28, 2012

(54) DEVICE FOR TRANSPORTING STRUCTURES ON WATER

(75) Inventors: Tor Ole Olsen, Lysaker (NO); Kolbjørn Høyland, Rykkinn (NO); Trond Landbø, Bekkestua (NO); Arnstein Godejord, Slependen (NO); Ronald Seim, Oppegård (NO)

(73) Assignee: Marine Offshore AS, Lysaker (NO)

( * ) Notice: Subject to any disclaimer, the term of this patent is extended or adjusted under 35 U.S.C. 154(b) by 629 days.

(21) Appl. No.: 11/795,946

(22) PCT Filed: Dec. 22, 2005

(86) PCT No.: PCT/NO2005/000477
§ 371 (c)(1),
(2), (4) Date: Nov. 10, 2008

(87) PCT Pub. No.: WO2006/080850
PCT Pub. Date: Aug. 3, 2006

(65) Prior Publication Data
US 2010/0143046 A1 Jun. 10, 2010

(30) Foreign Application Priority Data
Jan. 28, 2005 (NO) .................................. 20050515

(51) Int. Cl.
*B63B 35/44* (2006.01)
(52) U.S. Cl. ............ 114/258; 114/44; 405/206; 405/209
(58) Field of Classification Search .................. 114/31, 114/44, 45, 258, 259, 260; 405/195.1, 203, 405/204, 205, 206, 208, 209
See application file for complete search history.

(56) References Cited

U.S. PATENT DOCUMENTS

| 4,683,832 A | | 8/1987 | Dysarz | |
|---|---|---|---|---|
| 4,874,269 A | * | 10/1989 | Dysarz | 405/209 |
| 5,097,786 A | * | 3/1992 | Sheffield | 114/258 |

(Continued)

FOREIGN PATENT DOCUMENTS

GB 2 315 464 2/1998

(Continued)

OTHER PUBLICATIONS

Supplementary European Search Report issued Aug. 9, 2011 in corresponding European Application No. EP 05 82 1638.

(Continued)

*Primary Examiner* — Lars A Olson
(74) *Attorney, Agent, or Firm* — Wenderoth, Lind & Ponack, L.L.P.

(57) ABSTRACT

A device for transporting structures on water, as well as dismounting or installation of the structure(s) includes an elongated tilting frame (8) hingedly connected at a pivoting point (10) to a water vessel (6). The tilting frame (8) holds one or more support cribs (5) designed for being displaceable relative to the tilting frame and possibly relative to each other, the tilting frame further being designed to be able to assume an essentially horizontal or slightly tilted position, corresponding to a transport position, and being designed for being able to be tilted about the hinge connection to an essentially vertical position by suitable means, the vertical position corresponding to a lifting or operating position wherein the structure(s) carried by the support crib(s) may be lifted or lowered up from or down into the water, respectively, or up or down above water level.

29 Claims, 13 Drawing Sheets

U.S. PATENT DOCUMENTS

| | | | |
|---|---|---|---|
| 6,164,236 A | 12/2000 | Liu | |
| 6,550,411 B1 | 4/2003 | Hartogh et al. | |
| 6,923,598 B2 | 8/2005 | Vatsvåg | |
| 7,112,010 B1 * | 9/2006 | Geiger | 405/195.1 |
| 7,234,409 B2 * | 6/2007 | Hansen | 114/258 |
| 2004/0258483 A1 | 12/2004 | Vatsvag | |

FOREIGN PATENT DOCUMENTS

| | | |
|---|---|---|
| GB | 2 394 498 | 8/2006 |
| WO | 95/33892 | 12/1995 |
| WO | 98/26978 | 6/1998 |
| WO | 00/77306 | 12/2000 |
| WO | 02/14144 | 2/2002 |
| WO | 03/033342 | 4/2003 |

OTHER PUBLICATIONS

DTI, "Merlin Offshore Wind Turbine Installation System" Contract No. W/61/0061/00/REP, URN No. 04/1723; The Engineering Business Ltd., 2004, published 2004.

* cited by examiner

DEVICE FOR TRANSPORTING STRUCTURES ON WATER

The present invention relates to a device for transporting structures on water, as well as dismounting or installation of the structure(s).

The interest of installing windmills offshore is currently increasing. Large offshore windmill fields have already been developed. The advantage of positioning windmills on the sea is that the wind conditions generally are stable and good, and also that to some extent the noise pollution and visual pollution that have shown to be a problem in connection with onshore windmill fields is avoided.

The windmills that have been built so far, both onshore and offshore, have become increasingly larger both in size and effect. As it is desired to increase the height of the windmill towers, and thereby also the general size, there have been encountered limitations with regard to the lifting height and lifting capacity of offshore cranes. These considerations, in combination with larger and heavier wind turbines, have increased the interest of assembling the windmill towers and wind turbines horizontally at an onshore location.

Thus, an object of the present invention is to reduce the offshore work in connection with the construction and installation of windmills to a minimum. As far as possible, the windmill should be able to be built and prepared at an onshore site, and then it should be able to be lifted and transported to the intended destination by means of a lifting device, after which the lifting device should be able to position the windmill at a base or foundation that is either built on place or that has also been transported out to the location and then been lowered down and installed on the sea floor.

According to the present invention, this object is achieved by a device of the above-mentioned kind in which an elongated tilting frame is hingedly connected at a pivoting point to a water vessel, with the tilting frame holding one or more support cribs designed for being displaceable relative to the tilting frame and possibly relative to each other, and in which the tilting frame is designed to be able to assume an essentially horizontal or slightly tilted position, corresponding to a transport position, and to be able to be tilted about the hinge connection to an essentially vertical position by suitable means, with the vertical position corresponding to a lifting or operating position. Additional advantageous features and embodiments are set forth in the dependent claims.

BRIEF DESCRIPTION OF THE DRAWINGS

In the following, a detailed description of preferred embodiments of the present invention is given, with reference to the attached drawings, in which.

DETAILED DESCRIPTION OF THE INVENTION

Figure 1:
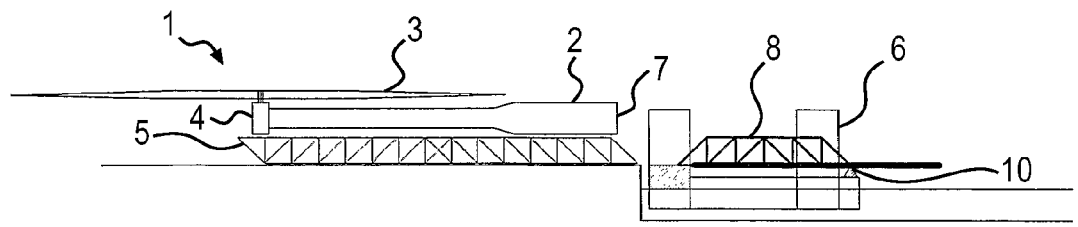
FIG. 1 shows a fully assembled windmill that is ready for being transported to an offshore location, and a lifting device according to an embodiment of the present invention.
Figure 2:
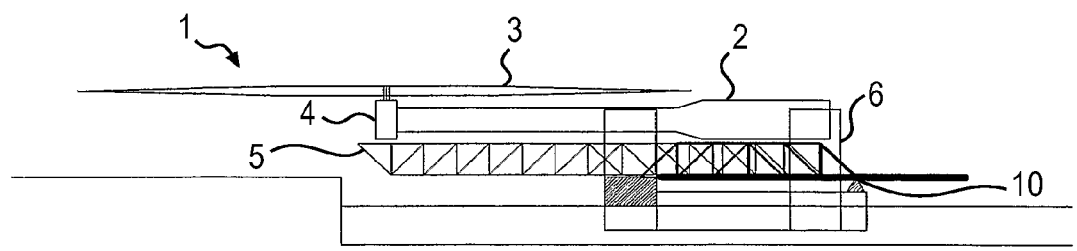
FIG. 2 shows the above windmill as it is pushed onto a lifting device according to an embodiment of the present invention.
Figure 3:
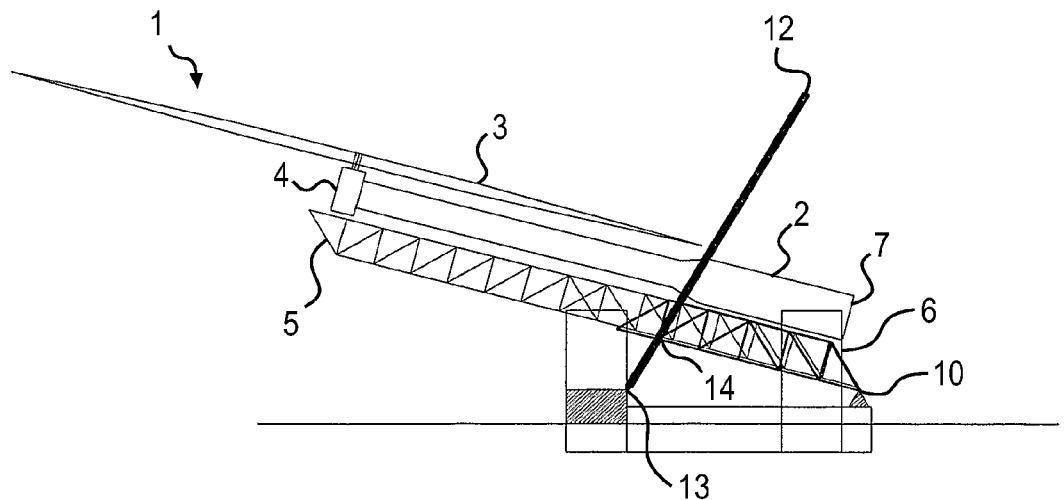
FIG. 3 shows the above windmill on a lifting device according to an embodiment of the present invention, the arrangement being ready for transport.
Figure 4:
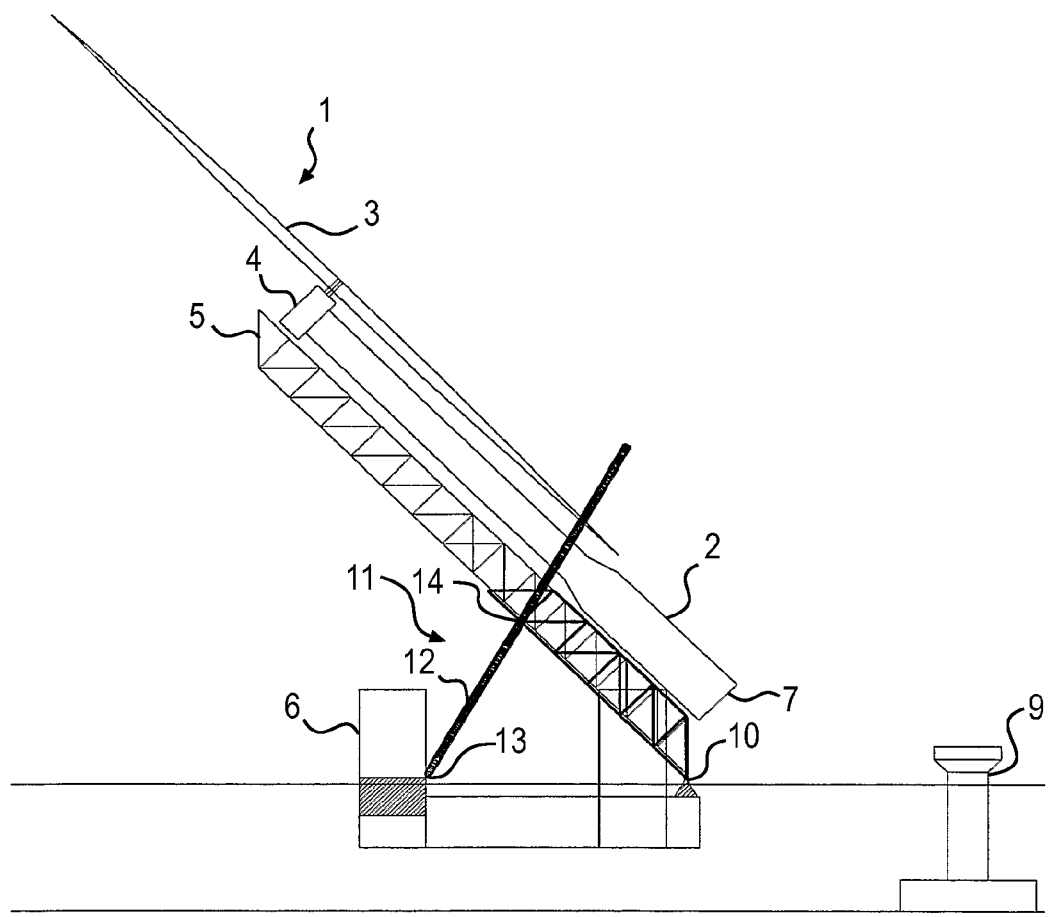
FIGS. 4 and 5 show how the windmill may be lifted to a vertical, upright position for installation onto a suitable base.
Figure 5:
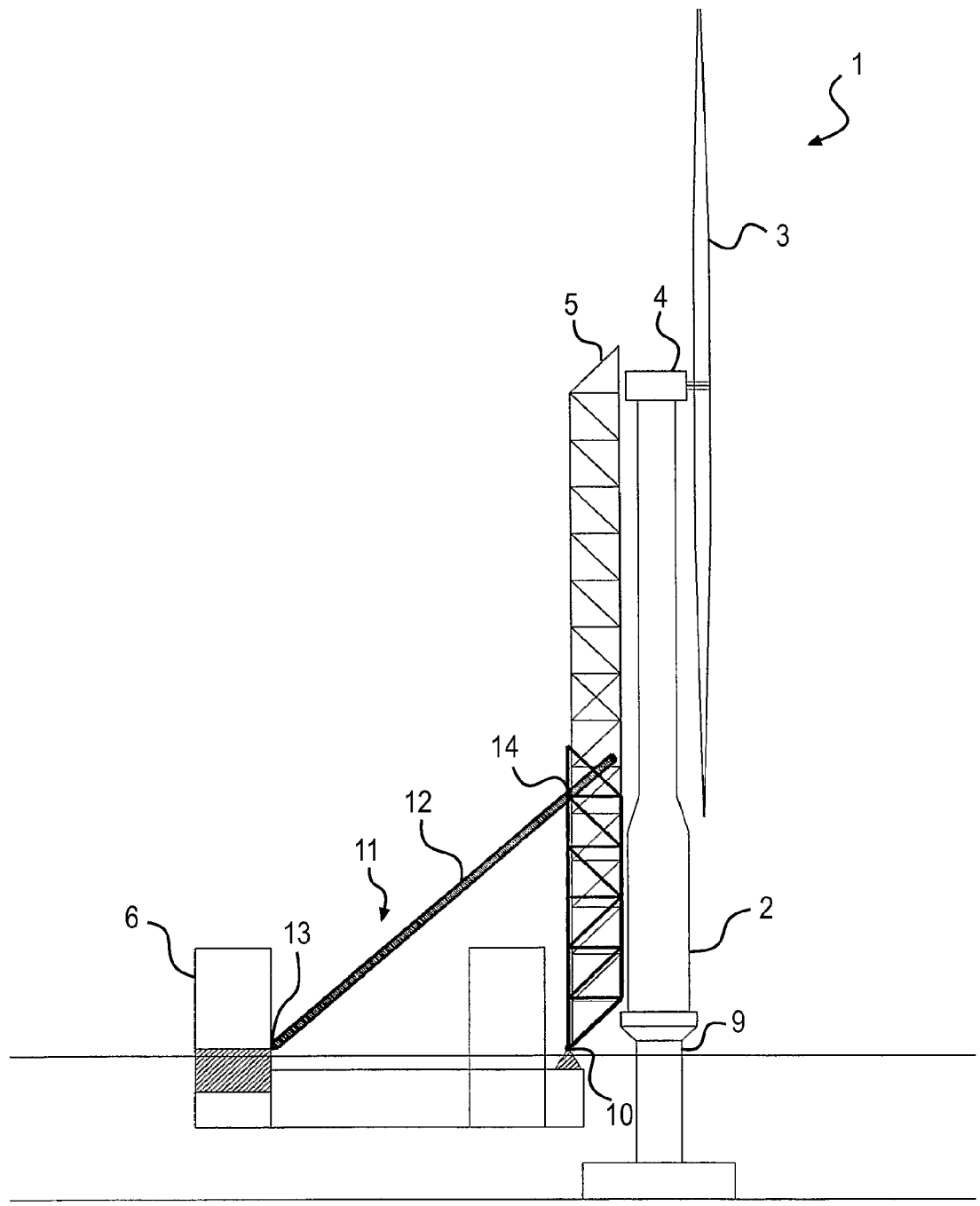

FIG. 1 shows a fully assembled windmill 1 including a tower 2, wings 3, and a generator 4. The fully assembled windmill 1 is positioned on a support crib 5. This assembly is disposed at an onshore site or a dock so that a transportation vessel, such as a barge 6, may call at the dock close to the assembled windmill 1. According to an embodiment of the present invention, the assembled windmill 1 is disposed at a dock having the foot 7 of the windmill closest to the water, and the barge is being positioned close to the foot 7. Then the complete windmill 1 on the support crib 5 is pushed in a longitudinal direction with the foot 7 in front onto the barge 6. The barge 6 includes a tilting frame 8 that partly surrounds the complete windmill 1 and the support crib 5. When the windmill 1 and the support crib 5 are safely positioned on the barge 6, the barge 6 with its load may put away from the dock. This is shown in FIG. 2. Before the transport can begin, according to an embodiment of the present invention, the load must first be tilted up to a transport position, as shown in FIG. 3. FIG. 4 shows how the load, including the windmill 1 and the support crib 5, is being raised up to an upright position during installation of the windmill 1 on the intended site. According to one embodiment of the present invention, the upright windmill 1 is placed on top of a preinstalled underwater base 9. During the installation, the tilting frame 8 on the barge 6 helps supporting the windmill 1 until it is fixedly arranged on the base 9 (FIG. 5).

The tilting frame 8 may in a suitable manner be hingedly connected at a pivoting point 10 in such a manner that the tilting frame 8 and the load 1, 5 may be tilted to an upright position about the pivoting point 10. The tilting frame 8 is tilted up to an upright position by suitable lifting means 11 (i.e., a lifting device), such as two stout rods 12 that at one end are hinged 13 to the barge 6 and that extend through sleeves 14 mounted on the tilting frame 8. The sleeves 14 are preferably pivotally mounted close to the "free" end of the tilting frame 8. When the tilting frame 8 then is to be tilted up or down from a lying or upright position, respectively, the rods 12 will run through the sleeves 14, the sleeves 14 and hinges 13 being allowed to rotate. The tilting frame 8 is tilted up by suitable jacking means, such as winches, gear wheels and/or hydraulics, for example. The support crib 5 is sliding in a groove on the tilting frame 8 in such a manner that it may not fall out, while at the same time the longitudinal position of the support crib 5 relative to the tilting frame 8 is adjustable by means of suitable winches, gear wheels and/or hydraulics, for example. The support crib 5 may be supported on the tilting frame 8 by means of suitable roller bearings or similar bearings that ensure low friction, little wearing, and maintenance-free use.

Figure 6:
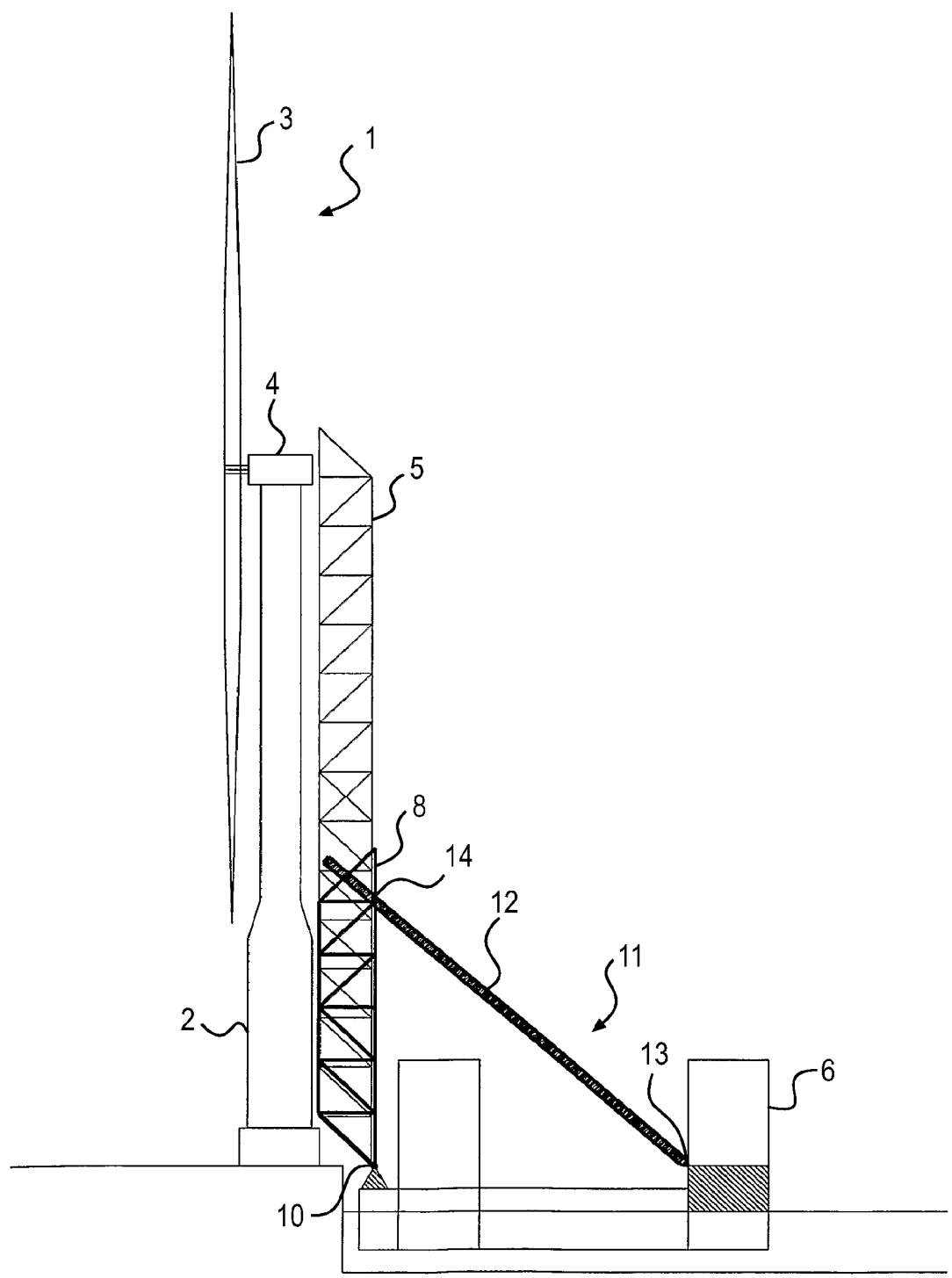
FIG. 6 shows an alternative embodiment of the present invention, wherein the windmill is assembled vertically at an onshore site, FIG. 7 corresponds to FIG. 3, and shows how the windmill according to the second embodiment of the present invention in this case is lowered down to a transport position, FIG. 8 corresponds to FIG. 5, FIGS. 9-13 essentially correspond to FIGS. 1-5, but in this embodiment the windmill also includes a complete base that must be transported along offshore.
Figure 7:
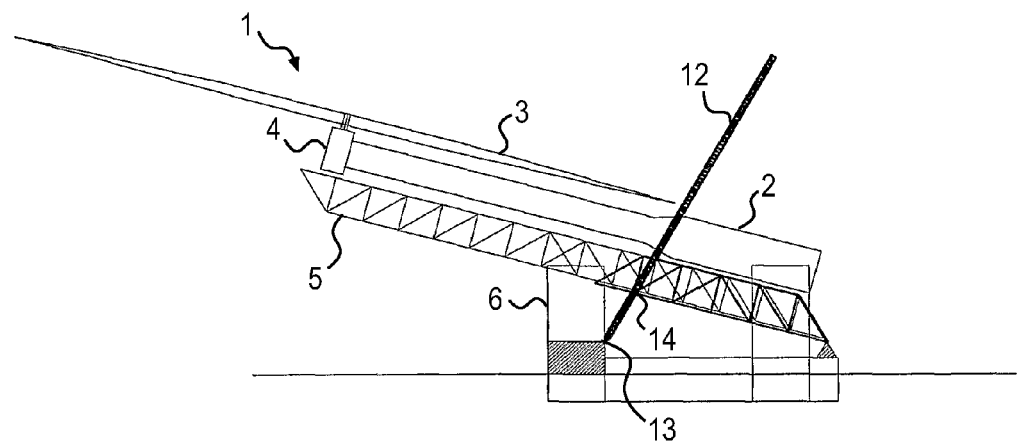
Figure 8:
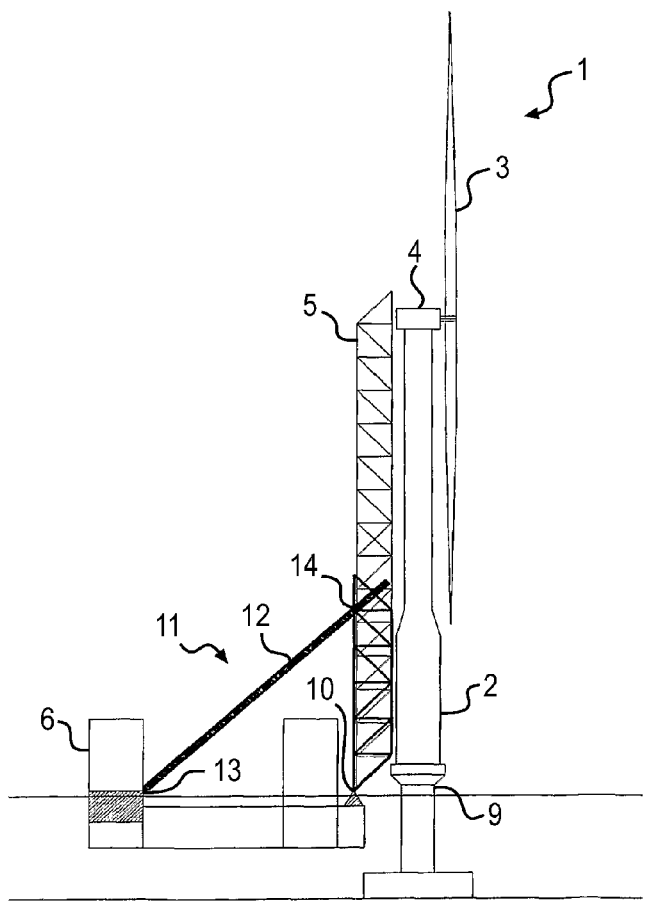
Figure 9:
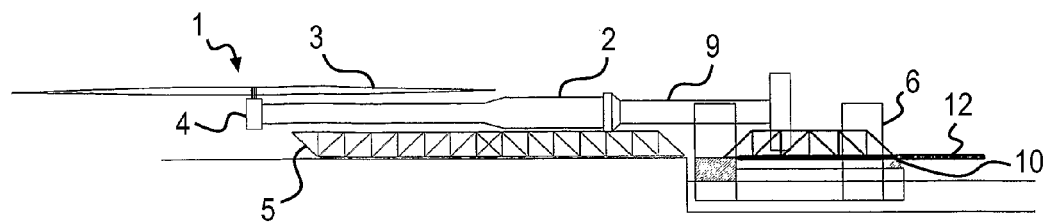
Figure 10:
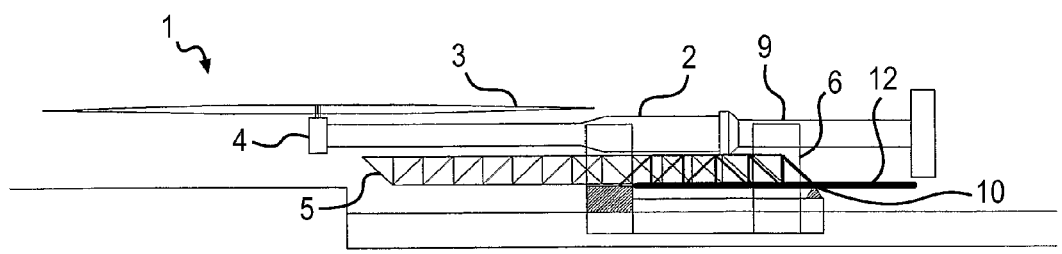
Figure 11:
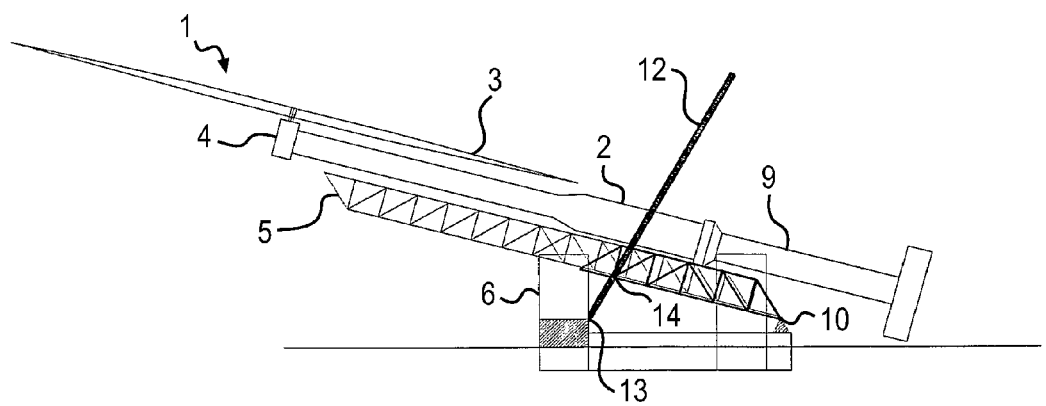
Figure 12:
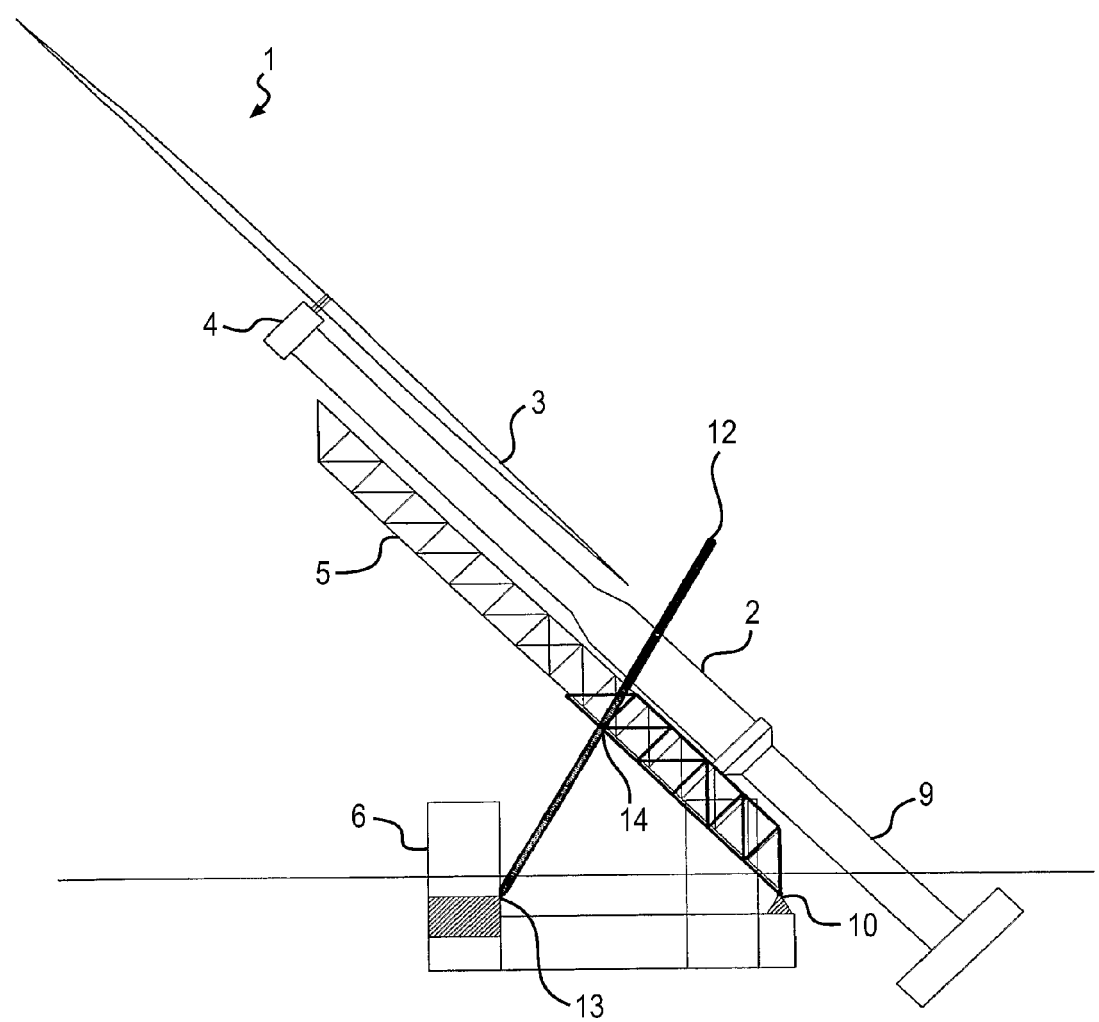
Figure 13:
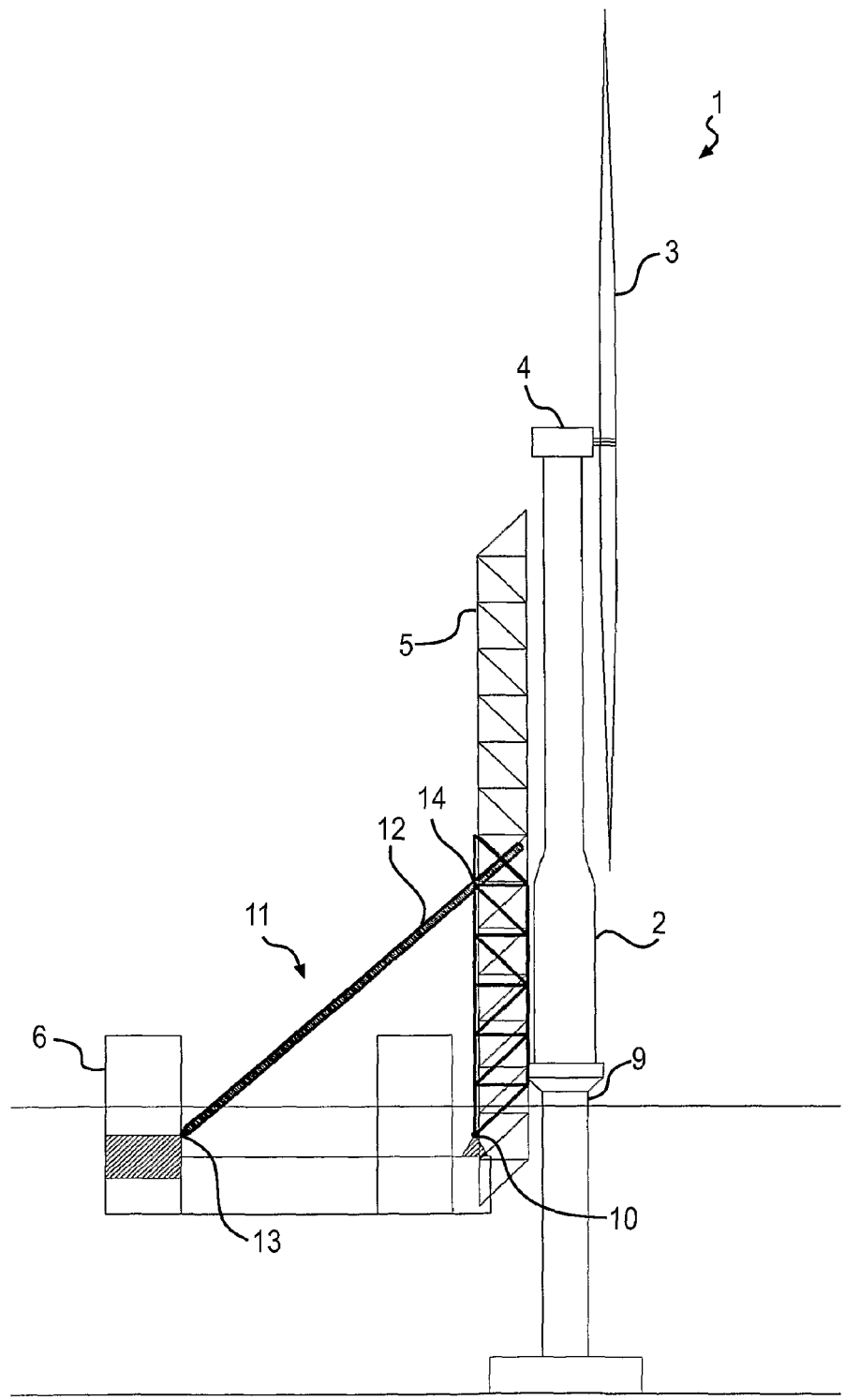

FIGS. 6-8 show how the device according to the present invention in a similar manner as described above may be used for transporting a fully assembled windmill 1 from the assembly location to the intended installation site, the windmill 1 in this case being assembled in an upright position and having to be tilted down to the transport position before the barge 6 with its load may put out from the dock. The equipment being used in this case is exactly the same as that described above, i.e. a support crib 5 is being used that may be displaced relative to a tilting frame 8 mounted on a barge or the like.

The present invention provides a flexible arrangement having a wide range of possible applications. As the support crib 5 is displaceable relative to the tilting frame 8, the arrangement may be used for installing long structures on different depths. If the base or foot of the long structure is to be installed below sea level, both the positioning of the long structure on the support crib 5 and the positioning of the support crib 5 itself on the tilting frame may be adapted according to the installation depth. Also, if required by the circumstances, on installation or dismount at especially large depths, for example, several cribs may be used that together provides a telescoping effect as the cribs may be shifted relative to each other so as to reach the desired depth or height.

It is realized that the present invention is not limited to the collection, transport and installation of windmills, but may be used for the collection, transport and installation of all kinds of long objects, for example in connection with bridge building, oil installations, etc.

It is also realized that the present invention is equally applicable in connection with the dismounting of offshore installations, wherein objects are picked up and transported to an onshore location or to a suitable offshore disposal location.

FIGS. 9-13 show essentially the same as FIGS. 1-5, but in this case the windmill 1 also includes a pre-mounted base that is put directly down onto the sea floor.

Figure 14:
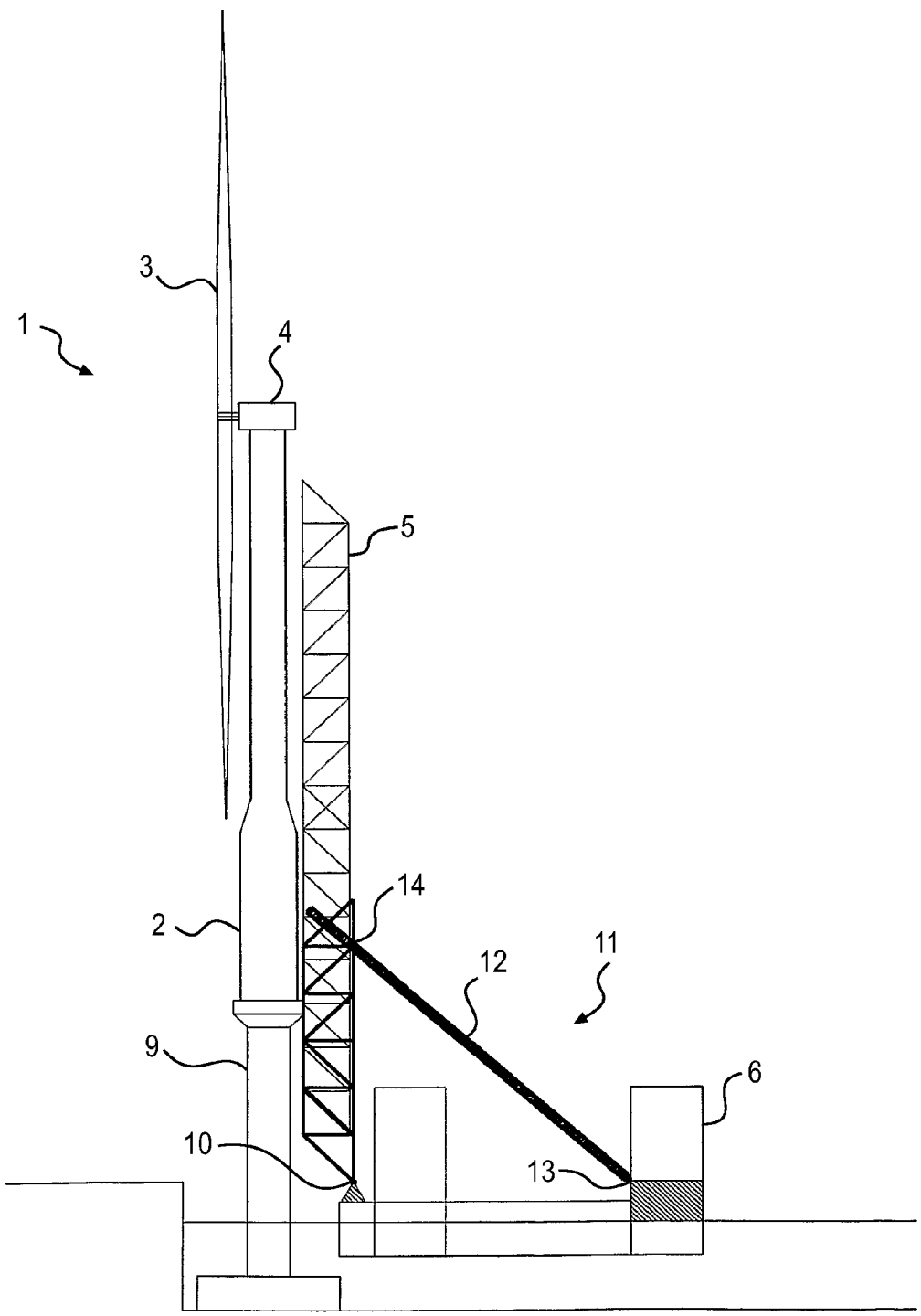
FIGS. 14-16 show a windmill including a complete base that is assembled vertically at an onshore location, and that is being lifted, and then transported and installed offshore.
Figure 15:
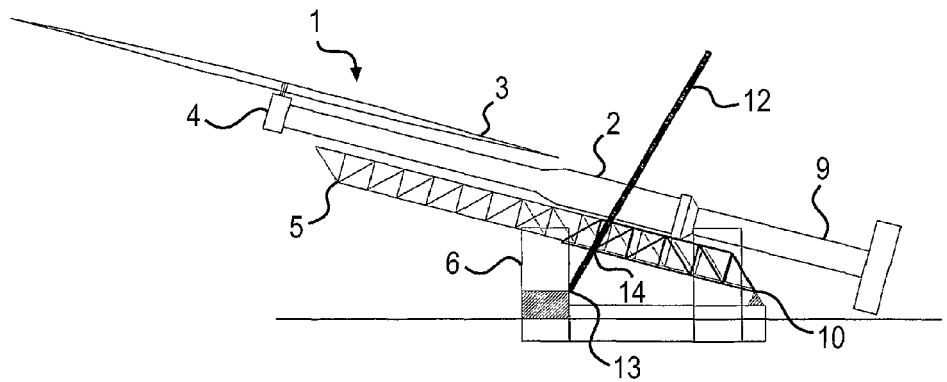
Figure 16:
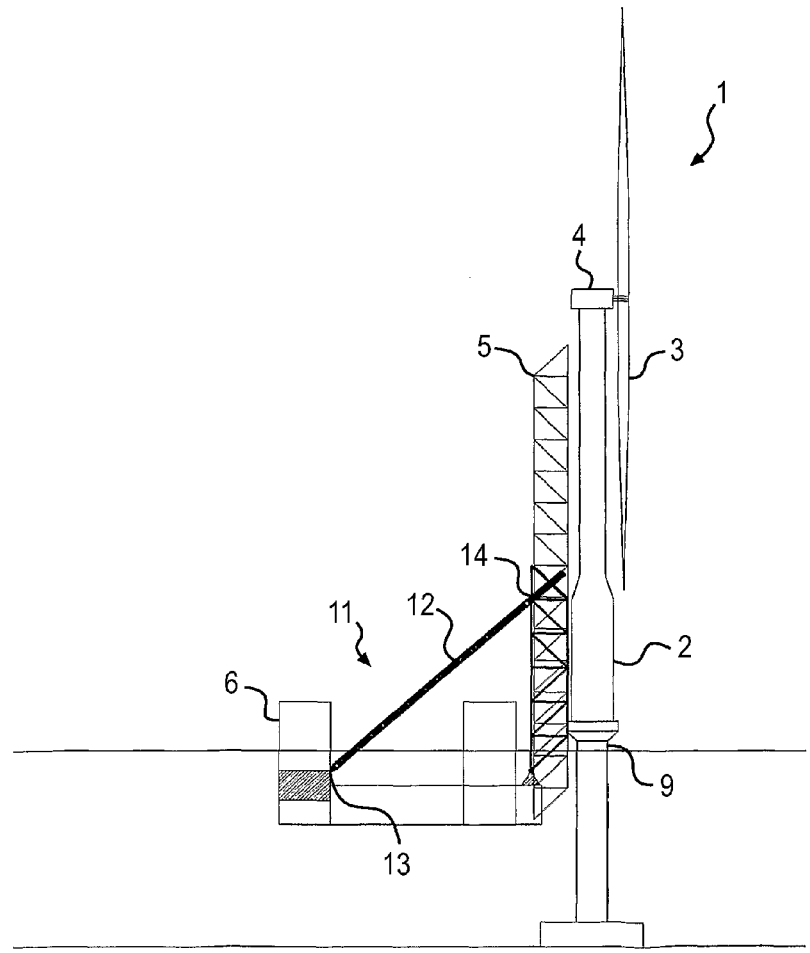
Figure 17:
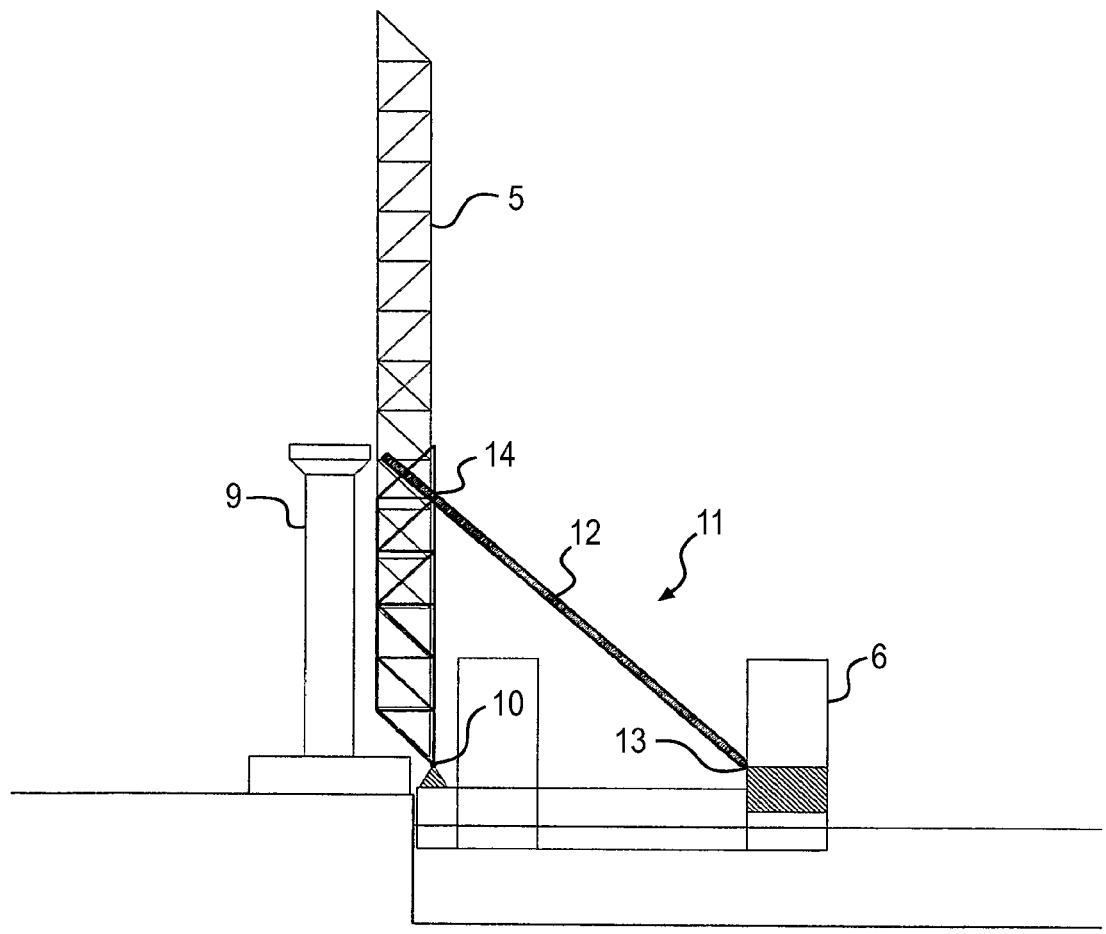
FIGS. 17-20 show how the device according to the present invention can be used for lifting, transporting and installing a base for a windmill or another structure that is to be mounted onto the base.

FIGS. 14-16 show a similar situation as in FIGS. 9-13, but in this case the windmill 1 is assembled in an upright position on top of a base, and the whole assembly is being picked up, transported and installed directly onto the sea floor.

Figure 18:
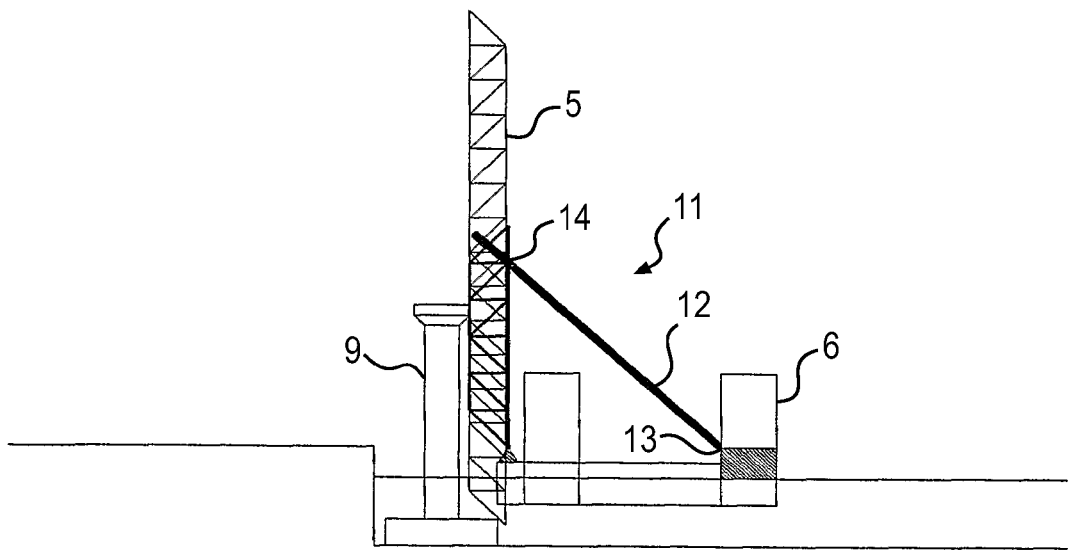
Figure 19:
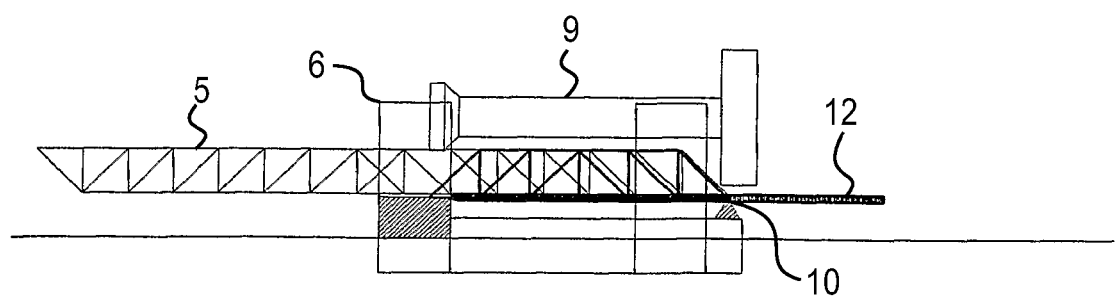

FIGS. 17-20 show how a base may be picked up from a dock, transported to an offshore location, and installed onto the sea floor. In FIG. 18, the support crib 5 is lowered down to a base being partly submerged in water, meaning that the support crib 5 is being displaced relative to the tilting frame 8. The support crib 5 may then be used as an "elevator" by pulling the base up to the barge by shifting the support crib 5 upwards relative to the tilting frame 8, after which the support crib 5 and the tilting frame 8 is tilted down to the transport position. As an alternative, the support crib 5 may be tilted up to an approximately horizontal position while being partly submerged, and then be displaced within the tilting frame 8 to the appropriate transport position.

Figure 20:
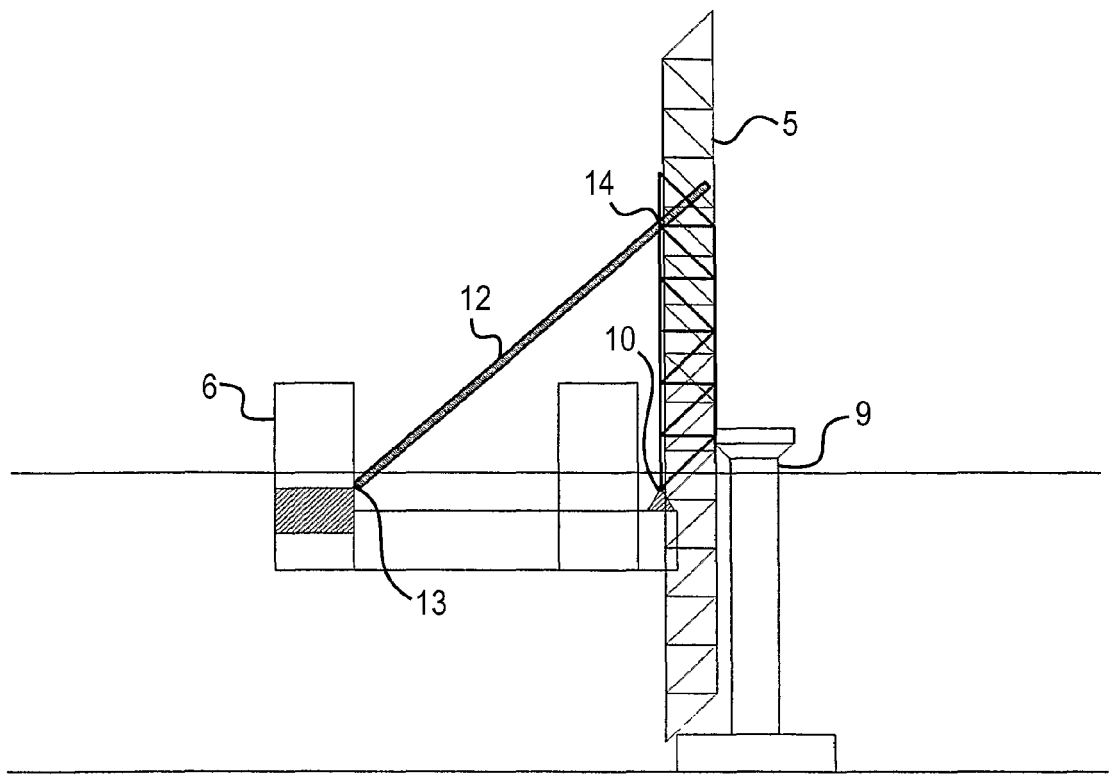

FIG. 20 shows a similar situation as FIG. 18, but in this case the structure is being installed rather than being collected. The water depth in this case is significantly larger and the support crib 5 must be shifted to a greater extent within the tilting frame 8 to allow for a safe and reliable installation of the base on the sea floor. It is realized that the above is equally applicable to something else than a base. It is also realized that the above not necessarily involves elongated structures, but is equally applicable to a more compact structure that is to be installed safely onto the sea floor or to be lifted up to a point above water level.

The invention claimed is:

1. A device for transporting a structure on water, as well as dismounting or installing the structure, comprising:
   an elongated tilting frame hingedly connected at a pivoting point to a water vessel, the tilting frame being tiltable about the hinge connection between an essentially horizontal position corresponding to a transport position, and an essentially vertical position, the vertical position corresponding to a lifting or operating position;
   at least one support crib held by the tilting frame so as to be displaceable relative to the tilting frame; and
   a lifting device for lifting the elongated tilting frame, the lifting device being hingedly connected to the water vessel and pivotally connected to the elongated tilting frame.

2. The device according to claim 1, wherein the lifting device includes jacking means selected from winches, gear wheels and hydraulics.

3. The device according to claim 2, wherein the tilting frame includes grooves, wherein the at least one support crib is arranged so as to be able to slide in the grooves in the tilting frame while being prevented from falling out from grooves, and wherein a longitudinal position of the at least one support crib relative to the tilting frame is adjustable by a device selected from winches, gear wheels and hydraulics.

4. The device according to claim 3, wherein the at least one support crib is designed so as to be able to be guided out from and into the tilting frame in the essentially horizontal position.

5. The device according to claim 4, wherein the at least one support crib is displaceable relative to the tilting frame in a state in which the tilting frame is in the essentially vertical position, in order for the at least one support crib to be able to reach down into the water or be extended above the water level.

6. The device according to claim 5, wherein the transported structure is a windmill or a windmill base.

7. The device according to claim 4, wherein the transported structure is a windmill or a windmill base.

8. The device according to claim 3, wherein the transported structure is a windmill or a windmill base.

9. The device according to claim 2, wherein the at least one support crib is designed so as to be able to be guided out from and into the tilting frame in the essentially horizontal position.

10. The device according to claim 9, wherein the at least one support crib is displaceable relative to the tilting frame in a state in which the tilting frame is in the essentially vertical position, in order for the at least one support crib to be able to reach down into the water or be extended above the water level.

11. The device according to claim 10, wherein the transported structure is a windmill or a windmill base.

12. The device according to claim 9, wherein the transported structure is a windmill or a windmill base.

13. The device according to claim 2, wherein the at least one support crib is displaceable relative to the tilting frame in a state in which the tilting frame is in the essentially vertical position, in order for the at least one support crib to be able to reach down into the water or be extended above the water level.

14. The device according to claim 13, wherein the transported structure is a windmill or a windmill base.

15. The device according to claim 2, wherein the transported structure is a windmill or a windmill base.

16. The device according to claim 1, wherein the tilting frame includes grooves, wherein the at least one support crib is arranged so as to be able to slide in the grooves in the tilting frame while being prevented from falling out from grooves, and wherein a longitudinal position of the at least one support crib relative to the tilting frame is adjustable by a device selected from winches, gear wheels and hydraulics.

17. The device according to claim 16, wherein the at least one support crib is displaceable relative to the tilting frame in a state in which the tilting frame is in the essentially vertical position, in order for the at least one support crib to be able to reach down into the water or be extended above the water level.

18. The device according to claim 17, wherein the transported structure is a windmill or a windmill base.

19. The device according to claim 16, wherein the transported structure is a windmill or a windmill base.

20. The device according to claim 1, wherein the at least one support crib is designed so as to be able to be guided out from and into the tilting frame in the essentially horizontal position.

21. The device according to claim 20, wherein the at least one support crib is displaceable relative to the tilting frame in a state in which the tilting frame is in the essentially vertical position, in order for the at least one support crib to be able to reach down into the water or be extended above the water level.

22. The device according to claim 21, wherein the transported structure is a windmill or a windmill base.

23. The device according to claim 20, wherein the transported structure is a windmill or a windmill base.

24. The device according to claim 1, wherein the at least one support crib is displaceable relative to the tilting frame in a state in which the tilting frame is in the essentially vertical position, in order for the at least one support crib to be able to reach down into the water or be extended above the water level.

25. The device according to claim 24, wherein the transported structure is a windmill or a windmill base.

26. The device according to claim 1, wherein the transported structure is a windmill or a windmill base.

27. The device according to claim 1, wherein the at least one support crib comprises a plurality of support cribs, each of the support cribs being displaceable relative to the tilting frame and displaceable relative to each other.

28. The device according to claim 1, wherein the lifting device includes rods extending through sleeves.

29. The device according to claim 28, wherein the lifting device includes jacking means selected from winches, gear wheels and hydraulics.

* * * * *